July 21, 1925.
W. E. DUNBAR
FILTER
Filed March 2, 1922
1,547,105
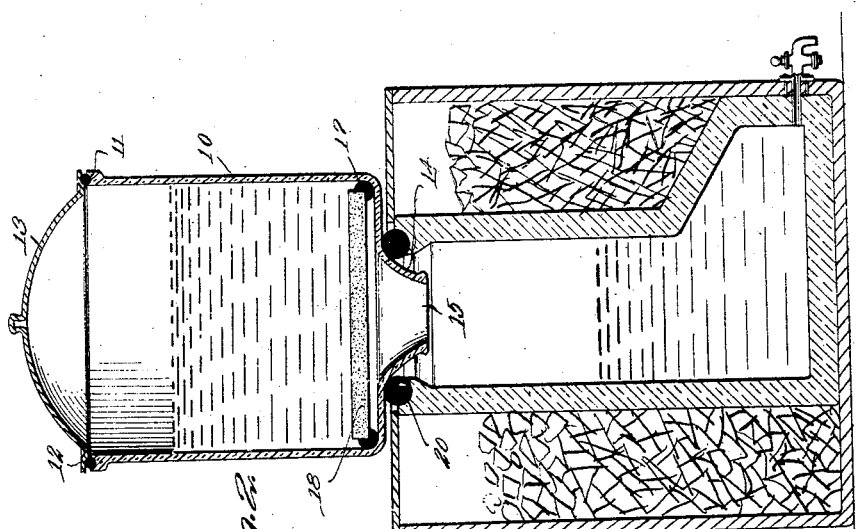
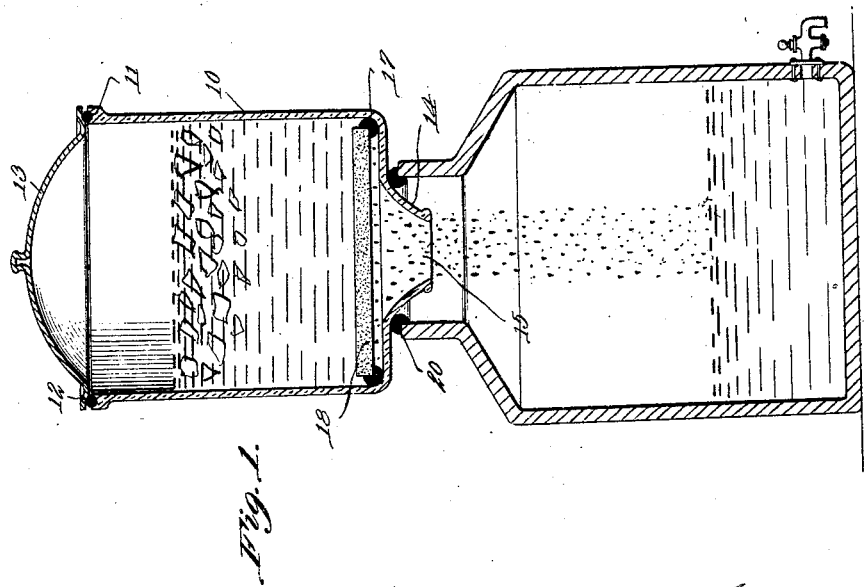
W. E. Dunbar
INVENTOR
BY Victor J. Evans
ATTORNEY
WITNESS:

Patented July 21, 1925.

1,547,105

UNITED STATES PATENT OFFICE.

WILLIAM E. DUNBAR, OF JACKSONVILLE, FLORIDA, ASSIGNOR TO FLORIDA FILTER CORPORATION, OF JACKSONVILLE, FLORIDA, A CORPORATION OF FLORIDA.

FILTER.

Application filed March 2, 1922. Serial No. 540,549.

*To all whom it may concern:*

Be it known that I, WILLIAM E. DUNBAR, a citizen of the United States, residing at Jacksonville, in the county of Duval and State of Florida, have invented new and useful Improvements in Filters, of which the following is a specification.

This invention relates to filters, and one object is to provide a device of this type which may be used in connection with a water cooler of the usual construction, or in connection with a cooler of the commercial type designed for receiving an inverted bottle, and may be employed for filtering water into a bucket, for use in batteries and wherever filtered water is required.

A further object is to provide a filter comprising a receptacle open at the top and formed with a bottom resembling the neck of a bottle, the central opening in the bottom being however of slightly greater diameter, if desired, and the walls adjacent to the opening providing a ledge on which the filter stone of standard commercial type is placed,—the stone being removable and being mounted on a rubber gasket.

A further object is to provide for the use, in connection with such a receptacle, of the ordinary top of a water cooler, and under other conditions to provide a top especially for this receptacle.

A further object is to provide a filter to be formed of glass, in order that it may be kept in perfect condition, from a sanitary standpoint, and the condition of the filter stone may be constantly observed and accumulation of sediment avoided by frequent cleaning.

A further object is to provide a filter especially adapted for use with a commercial type of cooler receiving an inverted bottle, air tight connection being effected between the bottle and the cooling chambers.

In the accompanying drawings, Figure 1 shows the device in vertical section as applied to a well-known type of cooler, and Figure 2 is a similar view of a filter applied to a cooler having separate water and ice compartments, or chambers.

With the foregoing and other objects in view, the invention consists in the novel features described and claimed, it being understood that modifications may be made within the scope of the claims, without departing from the spirit of the invention.

Experiment shows that if the cooling chamber is allowed to become about half full of filtered water before the bottle is fully seated on the gasket for effecting air tight connection with the cooling chamber, and such air tight connection is then effected by properly seating the bottle, but little more water will filter through the stone until a portion is drawn off from the faucet. The small portion which does filter through the stone due to the pressure of the column of water, on the porous filtering medium, increases the air pressure above the surface of the water in the cooling chamber, to an extent sufficient to effect a balance between the air pressure and the water pressure, and when that balance is secured the filtering operation will cease until a portion of the water is drawn off through the faucet, this operation being repeated continuously.

The glass receptacle is usually of cylindrical form, and is designated 10, being provided at the upper portion with an annular enlargement having a groove 11 therein for the accommodation of a rubber gasket 12.

The cover 13 may be the cover of the water cooler in connection with which the filter is employed, but under other conditions, a cover will be provided especially for the purpose. The lower portion of the receptacle approaches in form the upper portion of an ordinary water bottle, and this portion is designated 14, being provided however with an opening 15 slightly larger than the usual bottle opening. The portion 14 provides a ledge or the like for retaining the rubber gasket 17, preferably of the cross section shown, and the filter stone 18 is supported on this gasket, effecting a water tight connection. It is obvious from the drawing that the cross section of the gasket prevents contact between the stone and the relatively fragile wall and bottom of receptacle 10. Another gasket 20 is provided for effecting air tight connection between the element 14 and the receptacle into which the water is being filtered. All of the gaskets are of soft rubber, and the gasket 12 is expressly intended for preventing fracture of the glass, and is not air tight.

In Figure 1 I show this device as being employed in connection with an ordinary water cooler, and it is obvious that water may also be filtered into an ordinary bucket, as when providing pure water for garage purposes. In Figure 2 I have shown this device as being employed in connection with a cooler having separate water and ice chambers, the water chamber being designed to have air tight connection with the usual water bottle, but in this case having similar connection with the filter herein described,—after the device is in full operation, in the manner above specified.

Having thus described the invention I claim:

1. A filter comprising a hollow body having an open top and having a reduced lower portion with curved walls and a central opening, said lower portion and the curved walls thereof forming a supporting element, a gasket provided with an inner annular shoulder and having its lower surface resting upon the supporting element, a filter stone supported by the shoulder of the gasket, and a removable cover for the hollow body, the gasket being proportioned to space the stone above the supporting element and inwardly from the wall of the hollow body.

2. A filter comprising a hollow body having an open top, a side wall and a lower portion provided with a central opening, a removable cover for the top of the body, a filter stone within the hollow body, a container for receiving filtered water, means for cushioning said lower portion of the body from the container, and a gasket having an inner annular shoulder and annular recess, the shoulder supporting the filter stone and cushioning the latter from the side wall and the lower portion of the hollow body, both sides of said lower portion being relieved of shock by jarring and impact through the filter stone.

In testimony whereof I affix my signature.

WILLIAM E. DUNBAR.